US012750245B1

(12) United States Patent
Dall'Asta

(10) Patent No.: US 12,750,245 B1

(45) Date of Patent: Sep. 29, 2026

(54) PUBLIC KEY INFRASTRUCTURE SYSTEM FOR VALIDATING DIGITALLY SIGNED DATA STRUCTURES ACROSS COMMUNICATION CHANNELS

(71) Applicant: CTIA—THE WIRELESS ASSOCIATION, Washington, DC (US)

(72) Inventor: Kathryn Boylan Dall'Asta, Washington, DC (US)

(73) Assignee: CTIA—THE WIRELESS ASSOCIATION, Washington, DC (US)

( * ) Notice: Subject to any disclaimer, the term of this patent is extended or adjusted under 35 U.S.C. 154(b) by 0 days.

(21) Appl. No.: 19/635,678

(22) Filed: Mar. 31, 2026

(51) Int. Cl.
*H04L 9/32* (2006.01)

(52) U.S. Cl.
CPC .......... *H04L 9/3268* (2013.01); *H04L 9/3247* (2013.01); *H04L 9/3265* (2013.01)

(58) Field of Classification Search
CPC .... H04L 9/3268; H04L 9/3247; H04L 9/3265
See application file for complete search history.

(56) References Cited

U.S. PATENT DOCUMENTS

2005/0021969 A1* 1/2005 Williams .............. H04L 9/3268 713/176
2007/0177733 A1* 8/2007 Wajs ...................... H04L 9/0822 348/E7.056
2008/0010448 A1* 1/2008 Sabnis .................. H04L 9/3263 713/158
2010/0211792 A1* 8/2010 Ureche ................. H04L 63/126 713/176
2011/0019820 A1* 1/2011 Ureche ................. H04L 9/3247 380/255
2014/0223186 A1* 8/2014 Brown .................. H04L 9/3263 713/176
2017/0012943 A1* 1/2017 Kaliski, Jr. ......... H04L 63/0823
2021/0152372 A1* 5/2021 Hunt ....................... H04L 67/02

OTHER PUBLICATIONS

Harn et al., "Generalized Digital Certificate for User Authentication and Key Establishment for Secure Communications", May 2011, IEEE Transactions on Wireless Communications, vol. 10, No. 7, pp. 2372-2379 (Year: 2011).*

Mo et al., "Design of secure communications network system based on data encryption and digital signature", Jul. 2011, International Conference on High Performance Computing & Simulation, pp. 626-630 (Year: 2011).*

* cited by examiner

*Primary Examiner* — Kenneth W Chang
(74) *Attorney, Agent, or Firm* — ASHURST PERKINS COIE US LLP; Sumedha Ahuja; Vikram Iyengar

(57) ABSTRACT

Public key infrastructure (PKI) systems for validating digitally signed data structures across communication channels are disclosed. A system stores a digitally signed data structure associated with an entity identifier. The digitally signed data structure includes a header that references a digital certificate, a payload including verification claims associated with the entity identifier, and a digital signature cryptographically securing the payload. The system retrieves the digital certificate using the uniform resource identifier. The digital certificate includes a public key corresponding to a private key used to generate the digital signature. The digital certificate chains to a root certificate authority within a PKI. The system validates the digitally signed data structure and authorizes transmission of a message associated with the entity identifier to a user device.

20 Claims, 6 Drawing Sheets

PUBLIC KEY INFRASTRUCTURE SYSTEM FOR VALIDATING DIGITALLY SIGNED DATA STRUCTURES ACROSS COMMUNICATION CHANNELS

BACKGROUND

Communications across messaging and voice channels can involve different verification processes to confirm the identity of entities sending messages or initiating calls. These verification processes help wireless service providers and platform operators distinguish legitimate communications from fraudulent or unauthorized transmissions. Different communication channels, including rich communication services messaging, short message service messaging via short codes and long codes, toll-free messaging, and branded calling services, each maintain separate verification frameworks with distinct requirements, data collection procedures, and verification agents.

However, the fragmented nature of verification across multiple communication channels can create challenges to establishing verified identities for communications. An entity wishing to communicate across several channels may undergo separate verification procedures for each channel, submitting similar identity information to different verification systems. This multiplicity of verification processes can result in extended onboarding timelines, increased administrative burden, and inconsistent verification outcomes across channels. Additionally, the lack of interoperability between channel-specific verification systems limits the ability to leverage verification results obtained in one channel when seeking access to another channel.

BRIEF DESCRIPTION OF THE DRAWINGS

Detailed descriptions of implementations of the present invention will be described and explained through the use of the accompanying drawings.

Figure 1:
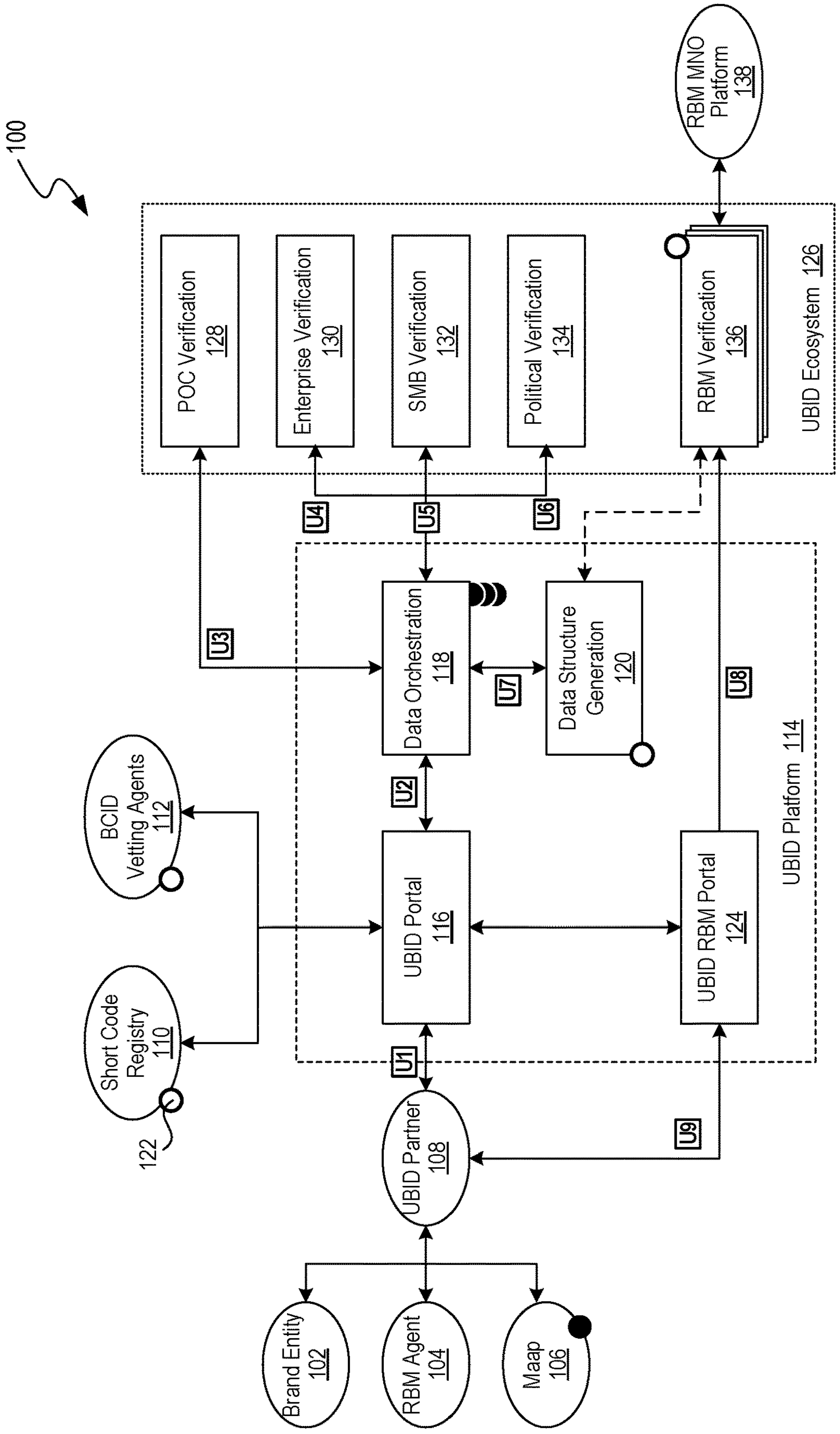
FIG. 1 is a drawing illustrating a system for cross-channel brand verification using a public key infrastructure in accordance with one or more embodiments of the disclosed technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Verification systems for communications typically use identity verification processes to confirm the identity of entities seeking to send messages or initiate calls using wireless networks. These verification processes can involve collecting information such as legal entity names, tax identification numbers, registered addresses, and points of contact, then validating this information against authoritative data sources. Different communication channels have developed their own verification frameworks independently, with each channel maintaining separate registries, verification endpoints, and acceptance criteria. For example, rich communication services (RCS) messaging verification involves confirming assets such as logos and display names in addition to entity identity, while short code messaging verification focuses on campaign registration and content compliance. The independent development of these verification systems has resulted in disparate data formats, inconsistent verification criteria, and incompatible technical interfaces between channels.

The lack of standardization across channel-specific verification systems creates several technical challenges. Verification endpoints for different channels can involve the same underlying identity information but in different formats, necessitating data transformation and re-submission for each channel. The verification results from one channel cannot be programmatically shared with or recognized by verification endpoints in other channels, requiring entities to undergo multiple complete verification procedures for each channel independently. This architectural fragmentation also limits the ability to implement unified trust frameworks, as verification credentials issued by one channel's verification endpoint lack the cryptographic properties and standardized claims necessary for validation by relying parties in other channels. Additionally, the absence of a common data orchestration layer means that verification workflows cannot be coordinated across multiple verification providers that specialize in different entity types, such as enterprises, small-to-medium entities, or political campaigns, each of which can have distinct verification requirements and data sources.

Embodiments disclosed herein address the technical challenges of fragmented verification systems across communication channels by providing a digitally signed data structure for cross-channel verification with public key infrastructure (PKI) validation. In various embodiments, the system stores a digitally signed data structure associated with an entity identifier, where the data structure includes a header configured to reference a digital certificate. The data structure contains a payload including one or more verification claims associated with the entity identifier and a digital signature configured to cryptographically secure the payload. The system retrieves the digital certificate associated with the data structure, where the digital certificate includes a public key corresponding to a private key used to generate the digital signature. The digital certificate chains to a root certificate authority as part of a PKI. The system validates the data structure by verifying, using the public key from the digital certificate, the digital signature, and confirming that the one or more verification claims in the payload satisfy one or more verification criteria associated with a communication channel. In response to validating the data structure, the system authorizes transmission of a message associated with the entity identifier to a user device.

In some embodiments, a data orchestration component receives a request from a portal interface for an entity to access multiple communication channels. Based on the entity type, the system selects an appropriate verification agent from among several available agents, where each verification agent follows a verification protocol suited to that entity type. The data orchestration component routes information using an external interface to the selected verification agent, which verifies the entity's identity and returns a verification result confirming the identity has been verified. The system then generates a communication channel-agnostic digitally signed data structure that indicates the entity's identity is verified. This data structure is transmitted to a verification endpoint associated with a particular communication channel. The verification endpoint can ingest the data structure to verify channel-specific assets without needing to re-verify the entity's identity. This architecture allows brand entities to complete verification once and then use a digitally signed data structure to access multiple communication channels, including RCS messaging, short code messaging, long code messaging, toll-free messaging, and/or branded calling services.

The solutions disclosed provides several technical benefits to cross-channel entity verification technology using concrete cryptographic mechanisms. For example, the existing vetting and verification processes in current short messaging service (SMS), multimedia messaging service (MMS), RCS, and voice channels today are fragmented, duplicative, unnecessarily redundant, and cause friction for entities and organizations who are trying to send messages or voice calls to consumers. The disclosed technical solutions can use JSON Web Tokens (JWT) in the JSON Web Signature (JWS) format, with a header, payload, and digital signature structure that enables programmatic validation across disparate channel verification systems. For example, the verification system signs the data structure using a private key associated with an X.509 certificate that validates back to an approved certificate authority. The header can include specific parameters, e.g., an x5u parameter that refers to a resource for a X.509 public key certificate or a certificate chain corresponding to a key used to digitally sign a JWT. The certificate chain is a linked sequence of one or more public key certificates that enables a certificate user to verify the authenticity signature on the last certificate in the path, and thus enables the user to obtain a certified public key of the system entity that is the subject of that last certificate.

The payload can include verification claims such as a subject identifier using an opaque Universally Unique Identifier (UUID) format and an expiration time identifying when the JWT must not be accepted for processing. For channel-specific assets, the fingerprints implemented can take the form of SHA-256 hashes of the image file that was verified. The disclosed cryptographic architecture enables entities to eliminate the inefficiencies of repeated identity and brand verification across multiple channels and only seek verification of channel-specific objects such as logo fingerprint and banner fingerprint for RCS for business messaging (RBM). The technical benefit provided is that communication channel offerings such as RBM, common short codes (CSCs), or branded calling ID (BCID) for rich call data (RCD) in the voice network can each validate the same data structure using PKI certificate chain verification while applying their own channel-specific acceptance criteria, thereby transforming fragmented verification workflows into an interoperable cryptographic validation system.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Public Key Infrastructure System for Validating Digitally Signed Data Structures FIG. 1 is a drawing illustrating a system 100 for cross-channel brand verification using a PKI in accordance with one or more embodiments of the disclosed technology. The entity 102 represents an organization seeking verification for communications across one or more communication channels. For example, the brand entity can use messaging agents and its products and services can be represented by logos and branding elements in messaging campaigns. The RBM agent 104 is associated with the entity 102 and can include agent identifiers registered on an RCS platform. The RBM agent 104 can interface with applicable partners using which messaging campaigns and interactions are conveyed. The Messaging-as-a-Platform (Maap) service 106 implements interactions with RCS services.

The universal brand ID (UBID) partner 108 serves as an intermediary that has a direct relationship with the entity 102 for purposes of brand verification and agent verification. For example, the UBID partner 108 is a direct connect aggregator, a launch partner, or a communication service provider. The system 100 includes external components such as a short code registry 110 and BCID vetting agents 112. The short code registry 110 represents a channel-specific verification resource for CSC messaging that interfaces with the UBID platform 114. The BCID vetting agents 112 represent channel-specific verification resources for BCID services that interface with the UBID platform 114.

The UBID platform 114 includes several functional components that coordinate verification workflows. The UBID portal 116 provides a portal interface for UBID partners to manage brands and agents in the system 100. The UBID portal 116 receives, from the portal interface, a request for access by an entity to multiple communication channels, where the request can include information identifying the entity and a type of the entity. The type of the entity can be enterprise, small-to-medium business (SMB), or political campaign, etc. The UBID portal 116 provides an application programming interface (API) to accept brand onboarding and manage UBID partners, their portfolios of brands, and RBM agents. The UBID portal 116 operates such that each UBID partner only has access to information about the brand entities onboarded by that UBID partner. The UBID portal 116 provides a mechanism for the UBID partner 108 to download a digitally signed data structure 122 when entity vetting is complete. The data structure 122 can be implemented as a cryptographic token, a JWT, or a data structure that uses a JWS format. The payload can be implemented as a data object or a JSON object, enabling the claims to be digitally signed or integrity protected. The UBID portal 116 supports migration of an entity from one UBID partner to another. The UBID portal 116 provides support for UBID partners for manual review and appeals of brand verification requests and RBM agent verification requests.

The data orchestration component 118 connects to the UBID portal 116 via interface U2. The interfaces U1-U9 are physical connections enabling data exchange between hardware components, modules, or system elements. U1 is an external interface connecting the UBID partner 108 to the UBID portal 116, while U2 is an internal interface between the UBID portal 116 and the data orchestration component 118. U3-U6 are external interfaces connecting the data orchestration component 118 to various verification agents. U7 is an internal interface between the data orchestration component 118 and the data structure generation component 120. U8 is an external interface between the UBID RBM portal 124 and the RBM agent verification 136. U9 is an external interface between the UBID partner 108 and the UBID RBM portal 124.

The data orchestration component 118 receives and processes onboarding requests from the UBID portal 116. The data orchestration component 118 selects, based on the type of the entity, a verification agent from multiple verification agents, where the selected verification agent is associated with a verification protocol corresponding to the type of the entity. A verification protocol is a defined sequence of steps and criteria used to confirm an entity's identity based on its type. The data orchestration component 118 routes, via an interface, information to the selected verification agent for verifying an identity of the entity. The data orchestration component 118 receives, from the verification agent, a first verification result indicating that the identity of the entity is verified, wherein the first verification result is generated by the verification agent using the information according to the verification protocol.

In some implementations, the data orchestration component 118 routes point of contact (POC) data to a know your customer (KYC) verification agent, and only after POC verification is confirmed does the data orchestration component 118 initiate the enterprise, SMB, or political verification process. The data orchestration component 118 can selects an appropriate verification agent (e.g., a know your business (KYB) verification agent) based on the type of entity being verified, with different verification agents specializing in enterprise, SMB, and political campaign verification. When multiple verification agents are available for an entity type, the data orchestration component 118 can use weighted round robin selection, with weighting determined by a UBID policy. The data orchestration component 118 can translate verification results from different verification agents into a standardized format before presenting the results to partners. The system 100 can further provide configurable error messaging that gives enough transparency for partners to understand verification failures without revealing the complete verification flow or algorithm.

The data structure generation component 120 generates data structures upon successful verification of the identity of the entity by the selected verification agent. The data structure generation component 120 connect to the data orchestration component 118 via the interface U7. The data structure generation component 120 generates, using the verification result and the information, a communication channel-agnostic data structure 122 indicating that the identity of the entity is verified. The data structure 122 is a secure digital credential issued after successful brand verification. For example, the data structure 122 has a validity period of 12 months, and the data structure generation component 120 generates a replacement data structure upon expiration of the validity period. The UBID RBM portal 124 provides functionality specific to RBM agent verification and connects to the UBID portal 116 via an internal interface.

The UBID ecosystem 126 includes multiple verification agents that perform identity verification according to entity-type-specific protocols. The POC verification agent 128 verifies points of contact associated with brand entities and connects to the data orchestration component 118 via interface U3. The POC verification agent 128 can collect a name, email address, and telephone number for each point of contact. For example, the POC verification agent 128 can verify that the POC is a current employee of the entity using two-factor authentication methods. If POC verification is not completed within a specified number of calendar days using two-factor authentication, the POC verification agent 128 can perform identification checks using liveness detection using real-time virtual meetings, real-time photo upload, a government issued ID, or AI-based document processing with deep-fake resistant methodologies.

The enterprise verification agent 130 verifies enterprise-type entities and connects to the data orchestration component 118 via interface U4. The SMB verification agent 132 verifies SMB entities and connects to the data orchestration component 118 via interface U5. The SMB verification agent 132 can use a tiered approach with four tiers based on entity size, e.g., Tier 1 for unregistered sole proprietors and micro entities with less formal documentation, Tier 2 for registered entities with 0-4 employees such as LLCs and partnerships, Tier 3 for registered entities with 5-50 employees having modest infrastructure and moderate messaging needs, and Tier 4 for registered entities with 51-499 employees having compliance staff, multi-location operations, and high throughput. The political verification agent 134 verifies political campaign entities and connects to the data orchestration component 118 via interface U6.

The enterprise verification agent 130, SMB verification agent 132, and political verification agent 134 can perform behavioral and reputational health verification, such as checking entity size, operational lifespan, country of origin risk, course of performance in messaging and voice channels, sanctions and global watchlists, relevant enforcement actions, relevant legal history, and/or adverse media.

The RBM verification agent 136 verifies RBM-specific brand assets and agent information, connecting to the UBID RBM portal 124 via interface U8. In some implementations, the RBM verification agent 136 serves as a verification endpoint associated with a particular communication channel. The particular communication channel can include an RBM channel, CSC messaging, 10-Digit Long Code (10DLC) messaging, or toll-free calling. For example, the data orchestration component 118 transmits, via an external interface, the data structure 122 to the RBM verification agent 136. The data structure 122 is configured for ingestion by the RBM verification agent 136 to verify one or more channel assets associated with the particular communication channel while avoiding re-verification of the identity of the entity. The one or more channel assets can include a logo fingerprint, a banner fingerprint, and/or an icon fingerprint associated with the entity. Each of the logo fingerprint, the banner fingerprint, and the icon fingerprint can include a cryptographic hash of an image file associated with the entity.

In some implementations, the data orchestration component 118 receives, from the RBM verification agent 136, a second verification result indicating that the one or more channel assets are verified. The data orchestration component 118 enables, based on receiving the second verification result, access by the entity to the particular communication channel. The RBM verification agent 136 also connects to the RBM mobile network operator (MNO) platform 138, which is an MNO platform for RCS services.

The interface U1 connects the UBID partner 108 to the UBID portal 116. A UBID portal public API can use representational state transfer (REST) operations with HTTP/1.1 or HTTP/2 methods including GET, POST, PUT, or DELETE combined with uniform resource identifiers (URIs). Parameters are passed in headers and JSON data content in request bodies. For API security, the system 100 can implement transport layer security (TLS) encryption and source IP address registration. The system 100 supports registration scenarios for public Internet access, access within Amazon Web Services™ (AWS), and access from private cloud environments using AWS Direct Connect. The system 100 achieves higher availability through deployment across multiple AWS availability zones in geo-redundant AWS regions. Automatic routing directs requests to the nearest endpoint based on availability and health conditions.

In some implementations, a brand partner registration API receives a brand partner name, one or more POCs, a verification credential, and/or a brand partner address to register a brand partner with the UBID platform and initiate the verification workflow for the brand partner's portfolio of brands. The verification credential enables a POC or brand partner to provide evidence from a recognized verification partner indicating that information has already undergone verification, which the system 100 confirms and can receive the proffered verification status. A brand registration API can receive a brand partner UUID, a brand name, a brand type (e.g., standard, SMB, political campaign), POC information, and/or a brand address for registering an entity under a brand partner's portfolio and initiating the appropriate verification workflow based on the brand type. An RBM verification agent API can receive a brand partner UUID, a brand UUID, and/or a legacy messaging fallback flag to verify RBM-specific brand assets and agent information for enabling access to the RCS messaging channel.

Figure 2:
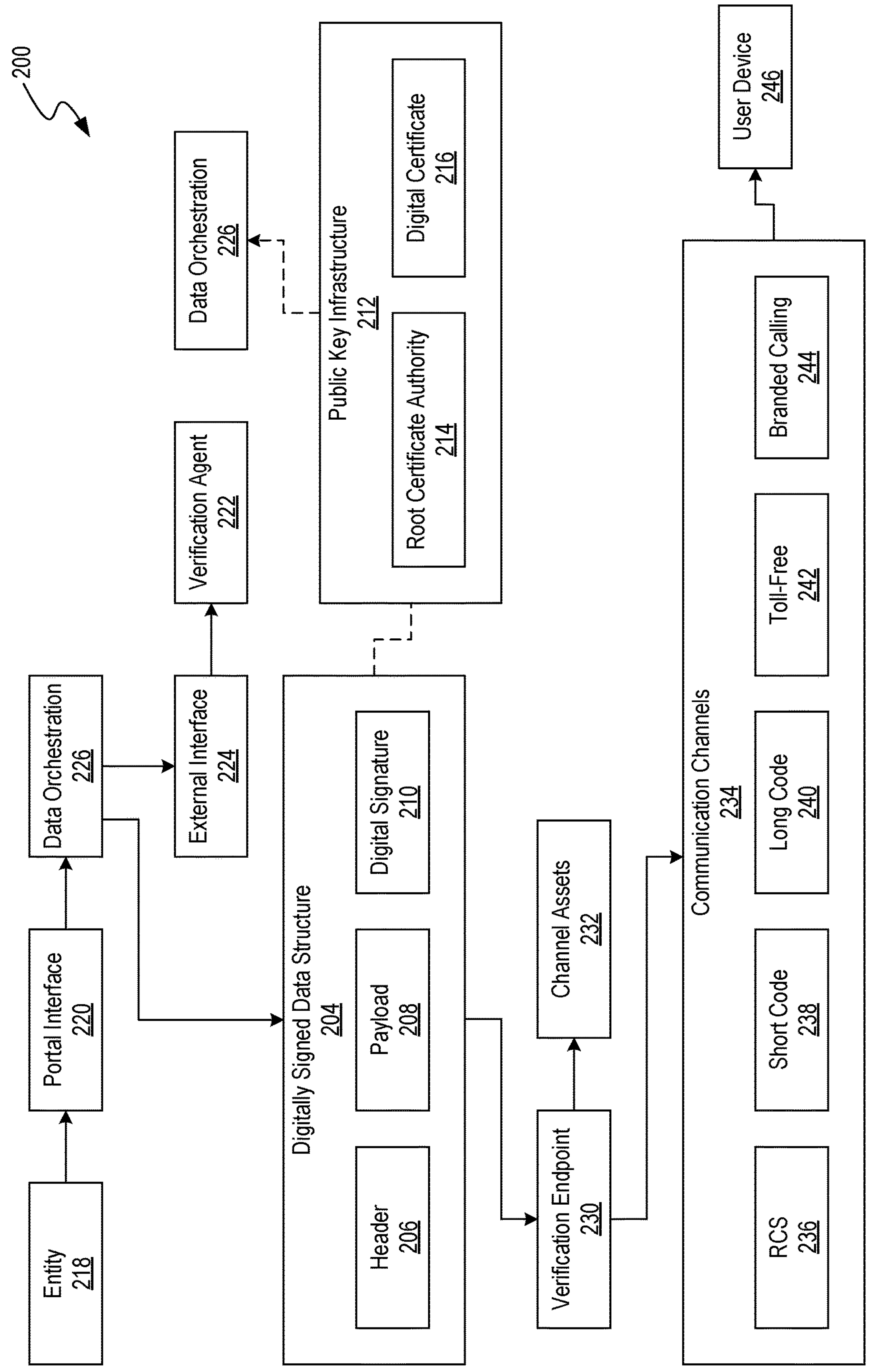
FIG. 2 is a block diagram that illustrates an example system that can implement aspects of the present technology.

FIG. 2 is a block diagram that illustrates an example system 200 that can implement aspects of the present technology. System 200 implements cross-channel brand verification using digitally signed data structure validation. System 200 includes a digitally signed data structure 204, a PKI 212, an entity 218, a portal interface 220, a verification agent 222, an external interface 224, a data orchestration component 226, a verification endpoint 230, channel assets 232, communication channels 234, and a user device 246. The system 200 stores the data structure 204, which is associated with an entity identifier, and the system 200 performs operations for validating the data structure 204 and authorizing transmission of messages over the communication channels 234. An entity identifier is a unique data element that distinguishes a specific organization or campaign within a verification and communication system.

The data structure 204 includes three components: a header 206, a payload 208, and a digital signature 210. In some implementations, the data structure 204 is a JWT that uses a JWS format, e.g., as specified in RFC7515 and RFC7519. The header 206 is configured to reference, using a URI, a digital certificate 216 associated with the data structure 204. The header 206 can include a JSON object signing and encryption (JOSE) header parameter. For example, the header 206 can specify a cryptographic algorithm used to generate the digital signature 210. The header 206 can include a "typ" parameter declaring the media type as JWT, an "alg" parameter identifying the cryptographic algorithm used to secure the JWT, and an "x5u" parameter that is a URI referring to a resource for a X.509 public key certificate or certificate chain corresponding to a key used to digitally sign the JWT.

In some implementations, the system 200 generates channel-specific data structures, which are different from channel-agnostic data structures. The channel-specific data structures are sometimes referred to as RBM verification agent tokens. A channel-specific data structure is a digital credential, generated by an RBM verification agent. The channel-specific data structure is a secure representation of a verification agent's ID, display name, and other digital assets displayed on an RCS Client as part of an agent profile. RBM verification agents can verify brand assets and other details of RBM agents, and successful verification results in an agent profile that is shared with associated partners, RCS service providers, and wireless service providers, where the verification endpoint creates and signs a channel-specific data structure that provides integrity protection to brand assets.

In some implementations, the one or more verification claims identify a name of the entity 218. For channel-specific data structures, the payload 208 can include an ID field for a verified agent without URI parameters, a brand_ID field containing a UUID of a brand associated with the agent, a name field (e.g., with a maximum of 100 characters) for the name of the verified agent, an icon_fingerprint field containing a SHA-256 hash of a file providing an agent icon image, and/or a banner_fingerprint field containing a SHA-256 hash of a file providing an agent banner image. The fingerprints in the channel-specific data structure can take the form of SHA-256 hashes of an image file that was verified, e.g., in lowercase hexadecimal without a 0x prefix.

The digital signature 210 is configured to cryptographically secure the payload 208. For example, the digital signature 210 is generated using algorithms specified as Recommended+ or Recommended in section 3.1 of RFC7518. The digital signature 210 can be generated using a private key associated with an X.509 certificate that chains to (validates back to) an approved certificate authority. The system 200 can retrieve, using the URI in the x5u parameter, the digital certificate 216 associated with the data structure 204. The digital certificate 216 includes a public key corresponding to the private key used to generate the digital signature 210.

The PKI 212 includes a root certificate authority 214 and the digital certificate 216. The digital certificate 216 chains to the root certificate authority 214 as part of the PKI 212. The digital certificate 216 can chain to the root certificate authority 214 through one or more intermediate certificates. The certificate chain is a linked sequence of one or more public-key certificates that enables the system 200 to verify the authenticity signature on the last certificate in the path, and thus enables the system 200 to obtain a certified public key of the system entity that is the subject of that last certificate.

In some implementations, the system 200 validates the data structure 204 by verifying the digital signature 210 using a public key from the digital certificate 216. Validating the data structure 204 can include verifying a certification path from the digital certificate 216 through the one or more intermediate certificates to the root certificate authority 214. Validating the data structure 204 can also include confirming that the digital certificate 216 has not expired. Validating the data structure 204 can further include confirming that the digital certificate 216 has not been revoked. The verification endpoint 230 can validate that the brand_ID references a known verified brand. The verification endpoint 230 can also determine that the certificate validates to an approved certificate authority. The system 200 confirms that the one or more verification claims in the payload 208 satisfy one or more verification criteria associated with a communication channel.

The entity 218 connects to the portal interface 220, which in turn connects to the data orchestration component 226. The data orchestration component 226 coordinates various verification processes and routes verification requests to the verification agent 222. The external interface 224 connects to the verification agent 222, and both the external interface 224 and the verification agent 222 connect to the data orchestration component 226. The system 200 receives the data structure 204 including the header 206, the payload 208, and the digital signature 210. The system 200 extracts one or more parameters from the header 206 identifying at least one of a cryptographic algorithm used to generate the digital signature 210, a certificate chain including a public key associated with a private key used to generate the digital signature 210, or a URI identifying a network resource (e.g., a web server, a certificate repository, API endpoints, a DNS server, or an authentication service) that is communicably coupled to the system 200. The system 200 retrieves, from the network resource, the certificate chain. The system 200 extracts, from the payload 208, one or more verification claims including a UUID identifying the entity 218, and an expiration time for the data structure 204. The system 200 determines that the certificate chain chains to the root certificate authority 214. The system 200 verifies, using the public key and the cryptographic algorithm, the digital signature 210.

The verification endpoint 230 connects to the channel assets 232. The channel assets 232 connect to the communication channels 234. The communication channels 234 can include multiple channel types, e.g., RCS 236, short code 238, long code 240, toll-free 242, and branded calling 244. A communication channel can include RCS messaging, short code messaging, long code messaging, toll-free messaging, or branded calling. Prior to the expiration time, the system 200 transmits, to a verification endpoint associated with a communication channel, the one or more verification claims to enable the entity 218 to access the communication channel. In response to validating the data structure 204, the system 200 authorizes transmission, over the communication channel, of a message associated with the entity identifier to the user device 246. The communication channels 234 connect to the user device 246, enabling transmission of messages associated with the entity identifier to the user device 246 upon validation of the data structure 204.

In some implementations, a data structure has a validity period of 12 months with an optional 60 day grace period for renewal. In the event that an entity's verification status changes in a way that would invalidate a data structure, such as failed UBID re-verification, expired data structure, or activity or event that causes failure of verification status, the data structure generation component 120 can issue a new data structure to replace the old one. Data structure revocation for compromised signing keys can be based on revocation of the associated certificate according to PKI procedures. Channel-agnostic data structures themselves are not revoked but are replaced administratively when verification status changes. The replacement is handled administratively between the verification agent and the various relying parties. If a data structure becomes compromised due to compromise of the signing key, the associated certificate can itself be revoked.

Figure 3:
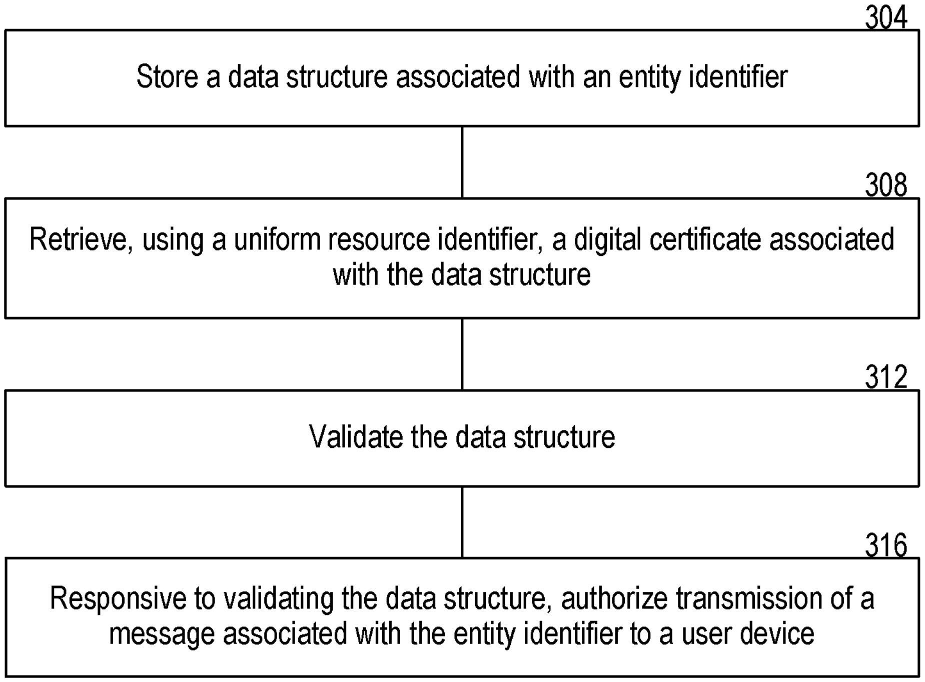
FIG. 3 is a flow diagram that illustrates an example method for validating a digitally signed data structure in accordance with various embodiments of the present technology.

FIG. 3 is a flow diagram that illustrates an example method for validating a digitally signed data structure in accordance with various embodiments of the present technology. The method can be executed by the system 100. In some implementations, the method is performed by the system 200 illustrated and described in more detail with reference to FIG. 2. In some implementations, the process is performed by a computer system, e.g., example computer system 600 illustrated and described in more detail with reference to FIG. 6. Likewise, implementations can include different and/or additional steps or can perform the steps in different orders.

At 304, a system stores a cryptographic data structure associated with an entity identifier (e.g., a UBID including a 128-bit UUID), such as "311b779e-381b-4cd8-b21d-1ce42e2d7c26." The data structure includes a header that specifies a cryptographic algorithm used to generate the digital signature. The cryptographic algorithm can be one of the algorithms specified as "Recommended+" or "Recommended" in cryptographic standards, such as ES256 for elliptic curve digital signature algorithm (ECDSA), e.g., using the P-256 curve and SHA-256 hash function, ES384 for ECDSA using the P-384 curve and SHA-384 hash function, or RS256 for RSA signatures using SHA-256. The header can include an "alg" parameter that identifies the cryptographic algorithm used to secure the data structure, enabling relying systems to programmatically determine the appropriate verification procedure for validating the digital signature using the public key from the X.509 certificate chain.

The data structure includes a payload that includes a claim set including a "sub" claim identifying a principal (brand name) that is the subject of the JWT, and a "sub_ID" claim that identifies the JWT subject using a subject identifier in an opaque UUID format. A verification agent signs the data structure using a private key associated with an X.509 certificate that validates back to an approved certificate authority. The disclosed data structure, combining JWT format with JWS digital signatures and X.509 certificate chain validation, provides standardized cryptographic properties that enable programmatic verification by a relying system with access to the PKI trust hierarchy, thereby addressing the technical problem of fragmented verification systems that lack interoperability across communication channels.

At 308, the system retrieves the digital certificate associated with the data structure using the URI specified in the x5u header parameter. The digital certificate includes a public key corresponding to a private key used by the verification agent to generate the digital signature. In some aspects, the public key is an ECDSA public key corresponding to the ES256 algorithm. The certificate chain includes a linked sequence of one or more public-key certificates. This sequence enables the system to verify the authenticity signature on the last certificate in the path. The system can thereby obtain a certified public key of the system entity that is the subject of that last certificate. The digital certificate chains to a root certificate authority as part of a PKI. The root certificate authority and the digital certificate enable programmatic verification by any relying system with access to the PKI trust hierarchy. This architecture addresses the technical problem of fragmented verification systems that lack interoperability across communication channels.

In some implementations, the digital certificate chains to the root certificate authority using one or more intermediate certificates, and validating the data structure includes verifying a certification path from the digital certificate using the one or more intermediate certificates to the root certificate authority. The certification path is a linked sequence of one or more public-key certificates that enables the system to verify the authenticity signature on the last certificate in the path, and thus enables the system to obtain from that last certificate a certified public key of the system entity that is the subject of that last certificate. For example, the certification path can include an end-entity certificate issued to the verification agent, an intermediate certificate issued by a subordinate certificate authority, and a root certificate issued by the root certificate authority, where each certificate in the chain is signed by the private key corresponding to the next certificate in the hierarchy.

At 312, the system validates the data structure by verifying the digital signature using the public key from the digital certificate. The system can confirm that the one or more verification claims in the payload satisfy one or more verification criteria associated with a communication channel. The system verifies the digital signature using the public key, e.g., extracted from a X.509 certificate and the cryptographic algorithm specified in the header. The verification criteria can differ based on the communication channel. RCS messaging verification can involve confirming entity assets such as logo fingerprints, banner fingerprints, and icon fingerprints in addition to entity identity. CSC messaging verification can be used for campaign registration and content compliance. BCID verification addresses can display data verification for voice channels. The disclosed validation process enables a single verified data structure to work across multiple channel-specific verification systems. This architecture addresses the technical problem of fragmented verification systems that call entities to undergo complete verification procedures for each channel independently.

In some implementations, validating the data structure includes confirming that the digital certificate has not expired and confirming that the digital certificate has not been revoked. The system can check the validity period of the certificate by comparing the current time against the certificate's "notBefore" and "notAfter" fields. This comparison ensures the certificate remains within its authorized timeframe. The system also verifies the revocation status of the certificate. The system can query a Certificate Revocation List (CRL) or use the Online Certificate Status Protocol (OCSP) to confirm that the certificate authority has not revoked the certificate. Revocation can occur due to compromise of the associated signing key or other security concerns. If a data structure becomes compromised due to compromise of the signing key, the associated certificate itself is revoked according to established procedures within the PKI.

At 316, in response to validating the data structure, the system authorizes transmission, over the communication channel, of a message associated with the entity identifier to a user device. The message can include interactive elements such as suggested replies and carousels. The message can also be an SMS message transmitted via a CSC code such as a five-digit or six-digit number. The disclosed authorization process enables the entity to communicate with user devices using the verified identity established by the data structure. A single verified data structure can authorize transmissions across multiple channel-specific verification systems. The entity does not need to undergo complete verification procedures for each channel independently.

In some implementations, first verification criteria associated with a first communication channel are different from second verification criteria associated with a second communication channel. The data structure is usable to authorize transmission of a second message over the second communication channel upon confirming that the verification claims satisfy the second verification criteria. For example, the first communication channel can include RCS messaging. The verification criteria for RCS include confirming entity assets such as logo fingerprints, banner fingerprints, and icon fingerprints in addition to entity identity. The second communication channel can include CSC messaging. The verification criteria for CSC can focus on campaign registration and content compliance. The data structure enables a single verified identity to be programmatically recognized by verification endpoints in both channels. The entity can access the second communication channel without undergoing complete verification procedures independently. The same data structure can satisfy different channel-specific verification criteria while leveraging the common verification claims in the payload.

Figure 4:
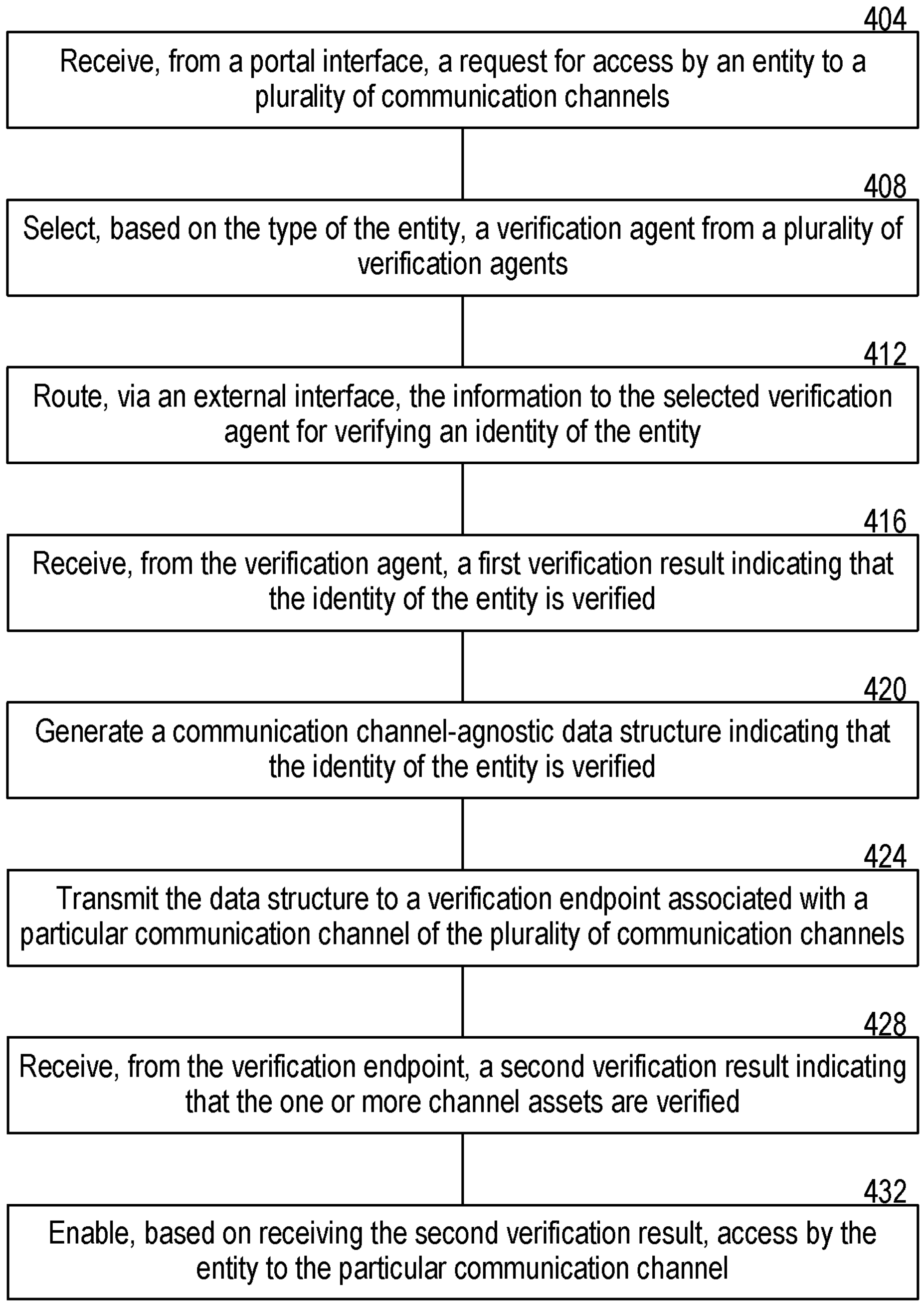
FIG. 4 is a flow diagram that illustrates an example method for enabling entity access to communication channels using verification of digitally signed data structures in accordance with various embodiments of the present technology.

FIG. 4 is a flow diagram that illustrates an example method for enabling entity access to communication channels using verification of digitally signed data structures in accordance with various embodiments of the present technology. The method can be executed by the system 100. In some implementations, the method is performed by the system 200 illustrated and described in more detail with reference to FIG. 2. In some implementations, the process is performed by a computer system, e.g., example computer system 600 illustrated and described in more detail with reference to FIG. 6. Likewise, implementations can include different and/or additional steps or can perform the steps in different orders.

At 404, a system receives a request for access by an entity to multiple communication channels. The request includes information identifying the entity and a type of the entity. A portal interface can be used to provide a consistent API, e.g., for partners to manage their brands in the system. The API performs onboarding and manages partners, their portfolio of brands, and agents. The information identifying the entity can include a legal entity name such as "Acme Corporation," a tax identification number, and/or a registered address. The portal interface can forward the onboarding request to a data orchestration component for vetting and registration.

At 408, the system selects, based on the type of the entity, a verification agent from multiple verification agents. The selected verification agent is associated with a verification protocol corresponding to the type of the entity. A verification agent is a computational entity that executes identity validation protocols. The verification agent can use predefined verification criteria against authoritative data sources for specific entity classifications. A data orchestration component can determine the appropriate verification agent by evaluating the entity type received in the request. In some implementations, multiple verification agents are available for an entity type. In such cases, the selection of the verification agent can be weighted round robin. Each verification agent is associated with a verification protocol that includes verification criteria uniquely tailored to the corresponding entity type. For example, enterprise entities with annual revenues exceeding $50 million can involve enhanced due diligence procedures. SMB entities can use streamlined verification workflows. Political campaign entities can involve specialized compliance checks that include Federal Election Commission registration validation.

At 412, the system routes, via an external interface, the information to the selected verification agent for verifying an identity of the entity. The routing operation can include transmitting the information using RESTful API calls over HTTPS with TLS 1.3 encryption. The routing operation can also include using webhook notifications that push verification request data to the verification agent's endpoint. The endpoint can be at a URL such as "https://kyb-provider.example.com/api/v1/verify." The information routed to the verification agent can include the legal entity name, tax identification number, country of registration, and organizational address fields. In some implementations, a data orchestration component normalizes the request data before routing. This normalization ensures compatibility with the verification agent's expected input format.

At 416, the system receives, from the verification agent, a first verification result indicating that the identity of the entity is verified. The first verification result is generated by the verification agent using the information according to the verification protocol. The verification agent provides confirmation of the entity verification to the data orchestration component using an internal interface, e.g., interface U3. The first verification result can include a verification status code such as "VERIFIED," "REJECTED," or "PENDING_REVIEW." The first verification result can also include a timestamp indicating when the verification was completed, such as "2026-03-15T14:32:00Z." In some implementations, the first verification result includes additional metadata. The additional metadata can include a verification confidence score ranging from 0.0 to 1.0, a verification agent identifier, and any flags indicating manual review requirements. The data orchestration component receives the confirmation or rejection and retains data about verified entities according to a data retention policy.

At 420, the system generates, using the verification result and the information, a communication channel-agnostic cryptographic data structure indicating that the identity of the entity is verified. A data structure issuer component receives data structure generation requests from a data orchestration component and generates a data structure for the verified entity. The data structure includes a header configured to reference a digital certificate associated with the data structure using a URI such as "https://ubid.example.com/certs/brand-token-signing.pem." The payload includes one or more verification claims associated with the entity. The verification claims can include a UUID in the format "550e8400-e29b-41d4-a716-446655440000" identifying the entity, a brand name, and an expiration time such as "2027-03-15T00:00:00Z." The data structure is intentionally lightweight and does not contain channel-specific requirements. This design enables the data structure to be used by channel specific vetting entities including RCS messaging, CSC, BCID, 10DLC, and toll-free TNs.

At 424, the system transmits the data structure to a verification endpoint associated with a particular communication channel via an external interface. The data structure is configured for ingestion by the verification endpoint to verify one or more channel assets associated with the particular communication channel while avoiding re-verification of the identity of the entity. The external interface can be between an RBM verification agent and a data structure generation component. The external interface can also be between a Partner Portal and RBM verification agents. The verification endpoint can include an RBM verification agent at a URL such as "https://rbm-va.example.com/api/v1/ingest-token," a CSC verification endpoint, or a BCID verification endpoint. The channel assets can include a logo fingerprint including a SHA-256 hash of a logo image file in JPG format, a banner fingerprint including a SHA-256 hash of a banner image file, an icon fingerprint, a display name having a maximum size of 100 characters, a primary color specified as a hexadecimal color value such as "#FF5733," a privacy policy URL, or a terms of service URL. The verification endpoint ingests the data structure and performs verification of the channel-specific assets. The verification endpoint does not require re-verification of the underlying entity identity that was previously verified during data structure generation.

At 428, the system receives a second verification result from the verification endpoint indicating that the one or more channel assets are verified. The fingerprints take the form of SHA-256 hashes of the image file that was verified, e.g., in lowercase hexadecimal without the "0x" prefix. For example, a logo fingerprint can include a SHA-256 hash such as "a3f2b8c9d4-e5f6a7b8c9-d0e1f2a3b4-c5d6e7f8a9-b0c1d2e3f4-a5b6c7d8e9" computed from a JPG image file containing the entity's logo. The RBM verification agent can return a channel-specific data structure to the partner portal after completing verification of the channel-specific assets. The second verification result can include a verification status indicating successful verification of the channel assets. The second verification result can also include a channel-specific data structure that includes a verified agent identifier, entity identifier, display name, and/or fingerprints for the icon and banner images. The verification endpoint can forward a channel-specific data structure to the appropriate mobile network operators for distribution. This forwarding enables the entity's agent profile to be distributed to RCS service providers and Wireless Service Providers.

At 432, based on receiving the second verification result, the system enables access by the entity to the particular communication channel. The system authorizes the entity to transmit messages or initiate calls over the particular communication channel. In some implementations, the system updates a channel access registry to indicate that the entity has been granted access to the particular communication channel. The partner portal provides a mechanism for the partner to download the channel-specific data structure when verification is complete.

In some implementations, a data structure has a validity period. A replacement data structure can be generated upon expiration of the validity period. The validity period can be specified as an expiration time claim within the payload of the data structure. For example, the validity period can range from 90 days for data structures associated with political campaign entities to 365 days for data structures associated with enterprise entities. A data orchestration component can scan ongoing vendor updates including data structure status changes and communicate them to relying systems or customer support workflows. Upon detecting that a data structure is approaching expiration, such as within 30 days of the expiration time, the system can initiate a re-verification process. The system can then generate a replacement data structure having a new validity period extending from the date of re-verification.

Figure 5:
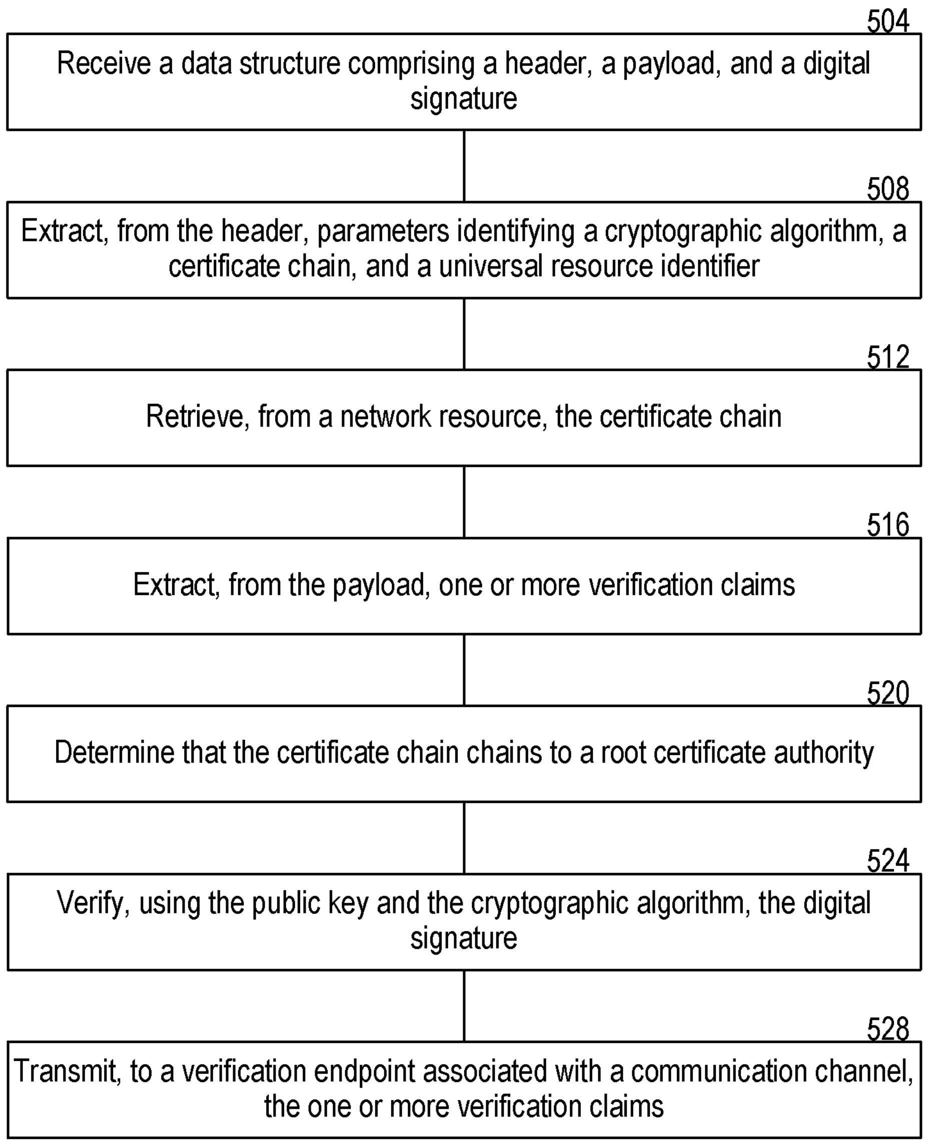
FIG. 5 is a flow diagram that illustrates an example method for validating digitally signed data structures and transmitting verification claims to enable channel access in accordance with various embodiments of the present technology.

FIG. 5 is a flow diagram that illustrates an example method for validating digitally signed data structures and transmitting verification claims to enable channel access in accordance with various embodiments of the present technology. The method can be executed by the system 100. In some implementations, the method is performed by the system 200 illustrated and described in more detail with reference to FIG. 2. In some implementations, the process is performed by a computer system, e.g., example computer system 600 illustrated and described in more detail with reference to FIG. 6. Likewise, implementations can include different and/or additional steps or can perform the steps in different orders.

At 504, a system receives a cryptographic data structure that includes a header containing one or more JOSE parameters, a payload encoding verification claims as a JSON object, and a digital signature that cryptographically secures the payload. A JOSE header parameter can be a type parameter ("typ") that declares the media type of the complete data structure as JWT, an algorithm parameter ("alg") that identifies the cryptographic algorithm used to secure the data structure such as ES256 for ECDSA operations, and/or an "x5u" parameter that is a URI referencing a network resource for a X.509 public key certificate or certificate chain corresponding to a key used to digitally sign the data structure. The JOSE header parameters can also include a critical parameter ("crit") that identifies extensions such as a data structure verification expiration time parameter ("botvfexpires"). The JOSE header parameters can further include a key identifier parameter ("kid") containing a unique identifier that references the specific key used for signing. The payload can include verification claims identifying the entity, e.g., as a name of the entity, a subject identifier in the form of a 128-bit universally unique identifier, and an expiration time on or after which the data structure is rejected.

The payload can include a subject claim ("sub") that identifies the entity that is the subject of the data structure, e.g., an entity name such as "Acme Corporation" or "First National Bank." The payload can also include a name claim that identifies the verified entity, such as "Service Name" or "Customer Support Agent." In implementations involving RCS messaging, the name claim can identify the name of a verified agent associated with the entity. The name of the entity enables relying parties such as RCS platform providers, wireless service providers, and third party channel partners to identify the verified entity when processing the token for channel access authorization.

In some implementations, the data structure is a claims token that encodes verification claims as a JSON object used as the payload of a JWS structure, enabling the claims to be digitally signed and integrity protected. The data structure can include a claim set containing standardized claims, e.g., a subject claim, a subject identifier claim ("sub_ID") that identifies the entity using a universally unique identifier, and/or an expiration time claim ("exp"). The data structure can also include channel-specific claims, e.g., an identifier claim referencing a known verified brand, a name claim identifying a verified entity, and/or fingerprint claims containing SHA-256 hashes of verified image files such as icon fingerprints and banner fingerprints.

At 508, the system extracts one or more parameters from the header identifying, e.g., a cryptographic algorithm used to generate the digital signature, a certificate chain including a public key associated with a private key used to generate the digital signature, and/or a URI identifying a network resource that is communicably coupled to the system. The URI can reference a network-accessible location such as a certificate repository server or a verification agent that stores the certificate chain. The certificate chain includes a linked sequence of one or more public-key certificates that enables a certificate user to verify the authenticity signature on the last certificate in the path, enabling the user to obtain a certified public key of the system entity that is the subject of that last certificate.

At 512, the system retrieves the certificate chain from the network resource. The system accesses the network resource identified by the URI to obtain, e.g., an X.509 public key certificate or certificate chain corresponding to a key used to digitally sign the data structure. A verification agent can make the certificate available to relying parties using an API or by other methods by mutual agreement.

At 516, the system extracts one or more verification claims from the payload including a UUID identifying an entity, and an expiration time for the data structure. The payload can include a claim set encoded as a JSON object. The payload can also include an expiration time claim that identifies the time on or after which the data structure is rejected, such as "2018-02-22T14:22:52Z."

At 520, the system determines that the certificate chain chains to (validates to) a root certificate authority. The system verifies a certification path from the digital certificate using the linked sequence of one or more public-key certificates, where the certification path enables the system to verify the authenticity signature on the last certificate in the path and obtain a certified public key of the system entity that is the subject of that last certificate. If the certificate does not validate to an approved certificate authority, data structure verification fails and the associated entity is treated as unverified. The system can verify the certification path using one or more intermediate certificates between the digital certificate and the root certificate authority.

At 524, the system verifies the digital signature using the public key and the cryptographic algorithm. The system uses the public key obtained from the digital certificate and the cryptographic algorithm identified in the header to verify that the digital signature cryptographically secures the payload. The system can verify the digital signature from the JWS using the certification path present in an x5u JOSE header, where the JWT is a JWS signed with an algorithm specified as "Recommended+" or "Recommended" in cryptographic algorithm standards. If the digital signature is not verified, data structure verification fails and the associated entity is treated as unverified.

At 528, the system transmits the one or more verification claims to a verification endpoint associated with a communication channel prior to the expiration time to enable the entity to access the communication channel. The verification endpoint can be associated with various communication channels including RCS messaging, CSC messaging, or 10DLC messaging. The data structure is configured for ingestion by the verification endpoint to verify one or more channel assets associated with the particular communication channel while avoiding re-verification of the identity of the entity. The system confirms that the current time is prior to the expiration time extracted from the payload before transmitting the verification claims.

In some implementations, the system receives a request to validate the data structure from a second verification endpoint associated with a second communication channel. The system transmits the one or more verification claims to the second verification endpoint to enable the entity to access the second communication channel using the data structure. The second communication channel can be different from the first communication channel. The data structure is a communication channel-agnostic data structure that is configured for ingestion by multiple verification endpoints. Each verification endpoint verifies channel assets associated with a particular communication channel while avoiding re-verification of the identity of the entity. This architecture enables a single verification procedure to result in a secure digital representation of a brand's verified identity. The secure digital representation can be used by channel-specific vetting entities. This approach reduces redundancy across channel-specific entity verification processes. The relying parties for each communication channel can verify the data structures using the same verification procedures. The relying parties include RCS platform providers, participating wireless providers, and third party channel partners.

Computer System

Figure 6:
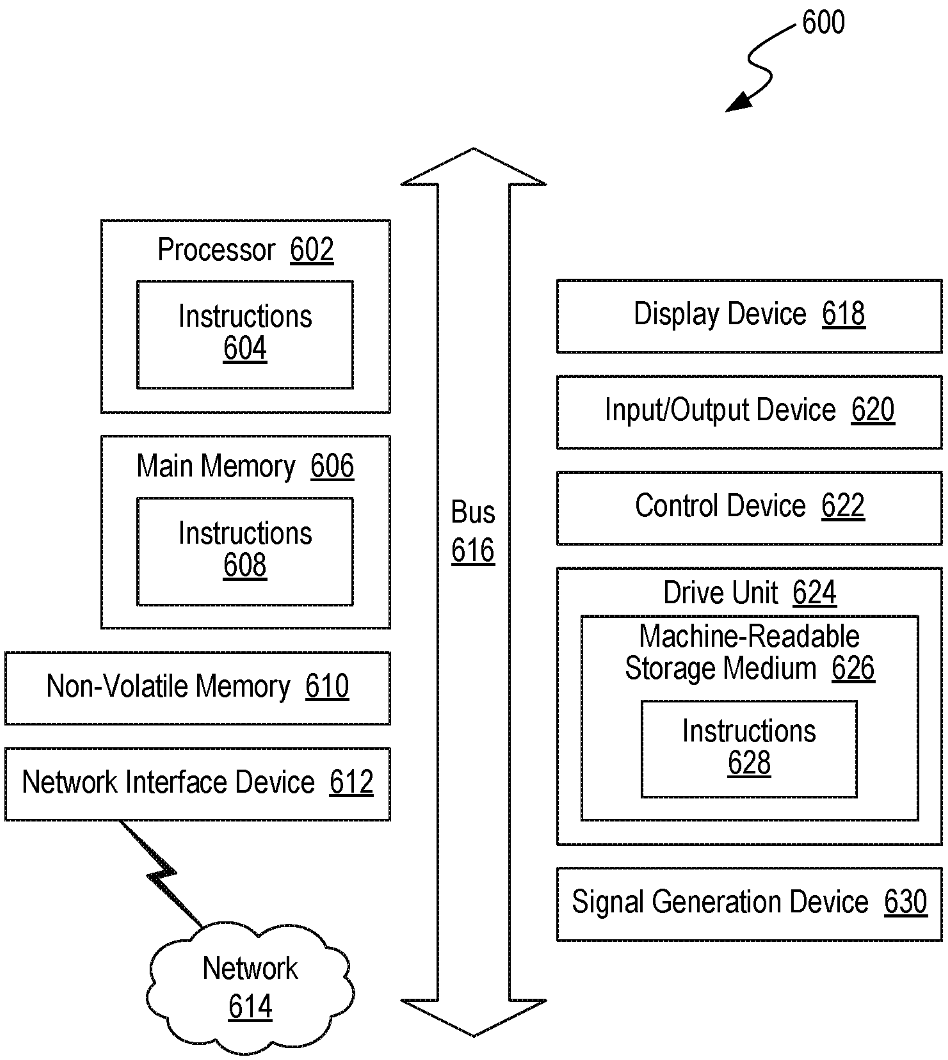
FIG. 6 is a block diagram that illustrates an example of a computer system in which at least some operations described herein can be implemented.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, a video display device 618, an input/output device 620, a control device 622 (e.g., keyboard and pointing device), a drive unit 624 that includes a machine-readable (storage) medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computing system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 600. In some implementations, the computer system 600 can be an embedded computer system, a system-on-chip (SOC), a single-board computer system (SBC), or a distributed system such as a mesh of computer systems, or it can include one or more cloud components in one or more networks. Where appropriate, one or more computer systems 600 can perform operations in real time, in near real time, or in batch mode.

The network interface device 612 enables the computing system 600 to mediate data in a network 614 with an entity that is external to the computing system 600 using any communication protocol supported by the computing system 600 and the external entity. Examples of the network interface device 612 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable medium 626 can include any medium that is capable of storing, encoding, or carrying a set of instructions for execution by the computing system 600. The machine-readable medium 626 can be non-transitory or include a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically include one or more instructions (e.g., instructions 604, 608, 628) set at various times in various memory and storage devices in computing device(s). When read and executed by the processor 602, the instruction(s) cause the computing system 600 to perform operations to execute elements involving the various aspects of the disclosure.

REMARKS

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

I claim:

1. A non-transitory, computer-readable storage medium comprising instructions recorded thereon, wherein the instructions, when executed by at least one data processor of a system, cause the system to perform operations comprising:

storing a digitally signed data structure associated with an entity identifier, wherein the digitally signed data structure comprises:

(i) a header configured to reference, using a uniform resource identifier, a digital certificate associated with the digitally signed data structure;

(ii) a payload including one or more verification claims associated with the entity identifier; and (iii) a digital signature configured to cryptographically secure the payload;

retrieving, using the uniform resource identifier, the digital certificate, wherein the digital certificate includes a public key corresponding to a private key used to generate the digital signature, wherein the digital certificate chains to a root certificate authority, and wherein the root certificate authority and the digital certificate are part of a public key infrastructure;

validating the digitally signed data structure by:

verifying, using the public key from the digital certificate, the digital signature, and confirming that the one or more verification claims in the payload satisfy one or more verification criteria associated with a communication channel; and responsive to validating the digitally signed data structure, authorizing transmission, over the communication channel, of a message associated with the entity identifier to a user device.

2. The non-transitory, computer-readable storage medium of claim 1, wherein the digitally signed data structure comprises a JSON web token (JWT) in a JSON web signature (JWS) format.

3. The non-transitory, computer-readable storage medium of claim 1, wherein the header specifies a cryptographic algorithm used to generate the digital signature.

4. The non-transitory, computer-readable storage medium of claim 1, wherein the digital certificate chains to the root certificate authority through one or more intermediate certificates, and wherein validating the digitally signed data structure comprises:

verifying a certification path from the digital certificate through the one or more intermediate certificates to the root certificate authority.

5. The non-transitory, computer-readable storage medium of claim 1, wherein validating the digitally signed data structure comprises:

confirming that the digital certificate has not expired; and confirming that the digital certificate has not been revoked.

6. The non-transitory, computer-readable storage medium of claim 1, wherein the communication channel comprises one of rich communication services (RCS), short code messaging, long code messaging, toll-free messaging, or branded calling.

7. The non-transitory, computer-readable storage medium of claim 1, wherein the one or more verification criteria associated with the communication channel are different from one or more second verification criteria associated with a second communication channel, and wherein the digitally signed data structure is usable to authorize transmission of a second message over the second communication channel upon confirming that the one or more verification claims satisfy the one or more second verification criteria.

8. A system comprising:

at least one hardware processor; and at least one non-transitory memory storing instructions, which, when executed by the at least one hardware processor, cause the system to perform operations including:

receiving a request for access by an entity to a plurality of communication channels, wherein the request includes information identifying the entity and a type of the entity;

selecting, based on the type of the entity, a verification agent from a plurality of verification agents, wherein the verification agent is associated with a verification protocol corresponding to the type of the entity;

routing, via an external interface, the information to the selected verification agent for verifying an identity of the entity;

receiving, from the verification agent, a first verification result indicating that the identity of the entity is verified, wherein the first verification result is generated by the verification agent using the information according to the verification protocol;

generating, using the first verification result and the information, a digitally signed data structure indicating that the identity of the entity is verified;

transmitting, via the external interface, the digitally signed data structure to a verification endpoint associated with a particular communication channel of the plurality of communication channels, wherein the digitally signed data structure is configured for ingestion by the verification endpoint to verify one or more channel assets associated with the particular communication channel while avoiding re-verification of the identity of the entity;

receiving, from the verification endpoint, a second verification result indicating that the one or more channel assets are verified; and enabling, based on receiving the second verification result, access by the entity to the particular communication channel.

9. The system of claim 8, wherein the particular communication channel comprises one of rich communication services (RCS) for business messaging (RBM), common short code (CSC) messaging, 10-digit long code (10DLC) messaging, or toll-free calling.

10. The system of claim 8, wherein the one or more channel assets comprise at least one of: a logo fingerprint, a banner fingerprint, or an icon fingerprint associated with the entity.

11. The system of claim 10, wherein each of the logo fingerprint, the banner fingerprint, and the icon fingerprint comprises a cryptographic hash of an image file associated with the entity.

12. The system of claim 8, wherein the digitally signed data structure includes:

a header configured to reference, using a uniform resource identifier, a digital certificate associated with the digitally signed data structure, a payload including one or more verification claims associated with the entity, and a digital signature configured to cryptographically secure the payload.

13. The system of claim 8, wherein the digitally signed data structure comprises a JSON web token (JWT) in a JSON web signature (JWS) format.

14. The system of claim 8, wherein the digitally signed data structure has a validity period, and wherein the operations include generating a replacement data structure upon expiration of the validity period.

15. A method comprising:

receiving, at a computer system, a digitally signed data structure comprising a header, a payload, and a digital signature;

extracting, from the header, one or more parameters identifying at least one of (i) a cryptographic algorithm used to generate the digital signature, (ii) a certificate chain including a public key associated with a private key used to generate the digital signature, and (iii) a uniform resource identifier identifying a network resource that is communicably coupled to the computer system;

retrieving, from the network resource, the certificate chain;

extracting, from the payload, one or more verification claims comprising a universally unique identifier (UUID) identifying an entity, and an expiration time for the digitally signed data structure;

determining that the certificate chain chains to a root certificate authority;

verifying, using the public key and the cryptographic algorithm, the digital signature; and prior to the expiration time, transmitting, to a verification endpoint associated with a communication channel, the one or more verification claims to enable the entity to access the communication channel.

16. The method of claim 15, wherein the one or more parameters comprise JSON object signing and encryption (JOSE) header parameters.

17. The method of claim 15, wherein the communication channel is one of a rich communication services channel, a short code channel, a branded calling channel, or a long code channel.

18. The method of claim 15, wherein the digitally signed data structure is a claims token.

19. The method of claim 15, wherein the one or more verification claims identify a name of the entity.

20. The method of claim 15, comprising:

receiving, from a second verification endpoint associated with a second communication channel, a request to validate the digitally signed data structure; and transmitting, to the second verification endpoint, the one or more verification claims to enable the entity to access the second communication channel using the digitally signed data structure.

* * * * *